United States Patent [19]
Frid

[11] Patent Number: 6,075,517
[45] Date of Patent: Jun. 13, 2000

[54] SYSTEM AND METHOD FOR SYNCHRONIZATION OF POINTING DEVICES WITH DIFFERENT DATA PACKET SIZES

[75] Inventor: Aleksandr Frid, San Francisco, Calif.

[73] Assignee: Phoenix Technologies Ltd., San Jose, Calif.

[21] Appl. No.: 09/307,776

[22] Filed: May 10, 1998

[51] Int. Cl.[7] .................................................. G09G 5/00
[52] U.S. Cl. .......................................... 345/156; 345/163
[58] Field of Search ..................................... 345/156–167, 345/168–178; 463/37; 178/19.01–19.07

[56] References Cited

U.S. PATENT DOCUMENTS

| | | | |
|---|---|---|---|
| 5,790,889 | 8/1998 | Witte | 395/828 |
| 5,917,472 | 6/1999 | Perala | 345/157 |
| 5,929,844 | 7/1999 | Barnes | 345/156 |
| 5,946,469 | 8/1999 | Chidester | 395/500 |
| 5,982,358 | 11/1999 | Fleming, III | 345/168 |
| 5,990,872 | 11/1999 | Jorgenson et al. | 345/168 |
| 6,011,541 | 1/2000 | Klein | 345/156 |

OTHER PUBLICATIONS

"Compatibility of Type 2 Pointing Devices with Microsoft IntelliMouse," Nov. 23, 1998, pp. 1–3.

*Primary Examiner*—Lun-Yi Lao
*Assistant Examiner*—Jimmy Ha Nguyen
*Attorney, Agent, or Firm*—Foley & Lardner

[57] ABSTRACT

A method and apparatus for enabling the use of two or more pointing devices with a computer, where the pointing devices generate data packets of different sizes. The maximum size of the data packets generated by the pointing devices is determined. Any data packets received from the pointing devices which are smaller than the maximum size have additional bytes added to increase the size of the data packet to the maximum size. Thus, the computer receives the same size data packets from all of the pointing devices, facilitating the use of multiple pointing devices.

11 Claims, 7 Drawing Sheets

SYSTEM AND METHOD FOR SYNCHRONIZATION OF POINTING DEVICES WITH DIFFERENT DATA PACKET SIZES

BACKGROUND OF THE INVENTION

1. Field of the Invention

The invention relates generally to controllers for computer pointing devices and specifically to controllers for use with pointing devices generating data packets of different sizes.

2. Description of the Related Art

Modern notebook or laptop personal computers typically provide an internal built-in pointing device for movement of the display cursor, as well as a connector for connecting an external pointing device for control of the display cursor. FIG. 1 shows a block diagram of the major hardware components of a typical notebook computer 10 with internal and external pointing devices.

The notebook computer 10 includes a keyboard and auxiliary device controller (KBC) 12 connected to a keyboard 14, internal pointing device 16, and external pointing device 18. The keyboard 14 is connected to the KBC 12 via a keyboard interface 20. The internal pointing device 16 is connected to the KBC 12 via a first auxiliary interface 22. For notebook computers, the internal pointing device 16 is typically a touch pad, trackball, or pointing stick built into the computer to control movement of the display cursor. The external pointing device 18 is connected to the KBC 12 via a second auxiliary interface 24. The external pointing device 16 is typically a mouse or trackball connected to an external connector of the computer, to provide an alternative means for control of the display cursor.

The KBC 12 is connected to a system bus 26 which is connected to CPU 28. The KBC 12 sends and receives data and control signals to and from the system bus 26, and receives data from the keyboard 14, internal pointing device 16, and external pointing device 18.

The standard IBM PS/2 mouse generates data packets containing three bytes of data, as shown in FIG. 2. These three bytes include one status byte containing data relating to the pointing device buttons and other status data (40), one data byte for data relating to movement of the cursor in the horizontal or X direction (42), and one data byte for data relating to movement of the cursor in the vertical or Y direction (44). This conventional data packet thus provides three bytes to describe cursor movement in a two-dimensional (i.e. X-Y) plane.

The new Microsoft IntelliMouse (and compatible pointing devices made by other manufacturers) includes a wheel control for scrolling the display screen (this can be considered control of the cursor movement in the Z direction). To accommodate this additional cursor control function, the IntelliMouse can operate in an extended mode in which it generates data packets containing four bytes, as shown in FIG. 3. Three of the bytes contain the same data as a standard mouse, i.e. one status byte (40) and two data bytes for cursor movement in the X and Y directions (42 and 44), and the fourth byte contains data relating to scrolling of the display (46). This type of mouse will be referred to as an extended mode pointing device.

The notebook computer's operating system includes a software device driver (e.g. a mouse driver) which processes data received from the internal and external pointing devices in order to generate signals to control the movement of the display cursor. The device driver typically switches to an extended mode in order to accept the four-byte data packets generated by an extended mode pointing device. However, when the mouse driver enables this extended mode, it can no longer accept standard three-byte data packets. Furthermore, in order to switch out of this extended mode, the operating system must typically be restarted.

One existing solution to this problem is to automatically disable the internal pointing device when an external pointing device is connected and the system driver switches the system into extended mode for accepting four-byte data packets. However, this approach makes it impossible to operate both an internal and external pointing device at the same time, and the user cannot use both pointing devices simultaneously.

SUMMARY OF THE INVENTION

The present invention is directed to overcoming or at least reducing the effects of the problems set forth above. The present invention enables the use of one or more pointing devices with a computer, where the pointing devices generate data packets of different sizes. The maximum size of the data packets generated by the pointing devices is determined, and any data packets received from the pointing devices which are smaller than the maximum size have additional bytes added to increase the size of the data packet to the maximum size.

Thus, in accordance with one aspect of the invention, a method for operating a computer in conjunction with one or more pointing devices is provided including the steps; of determining a maximum size of the data packets generated by the pointing devices, receiving a first data packet from a first pointing device, determining if the first data packet has a size smaller than the maximum size, and increasing the size of the first data packet so that the first data packet has a size equal to the maximum size.

In accordance with another aspect of the invention a computer system is provided comprising one or more pointing devices which generate data packets and a controller connected to the pointing devices for receiving the data packets. The controller determines the maximum size of the data packets and adds one or more bytes to each data packet received from the pointing devices which is smaller than the maximum size. The controller may determine the maximum size of the data packets by sending a command to each of the pointing devices for causing each of the pointing devices to respond with a device identifier indicating the size of data packet generated by the respective pointing device. The controller receives the device identifiers from the pointing devices and analyzes the device identifiers to determine the maximum size of the data packets generated by the pointing devices.

As a result of use of the invention, simultaneous operation of multiple pointing devices is possible even when an extended mode pointing device or other pointing device with a nonstandard data packet size is used. Thus, a notebook computer user may enjoy the convenience of using both internal and external pointing devices simultaneously.

BRIEF DESCRIPTION OF THE DRAWINGS

The foregoing advantages and features of the invention will become apparent upon reference to the following detailed description and the accompanying drawings, of which.

Figure 1:
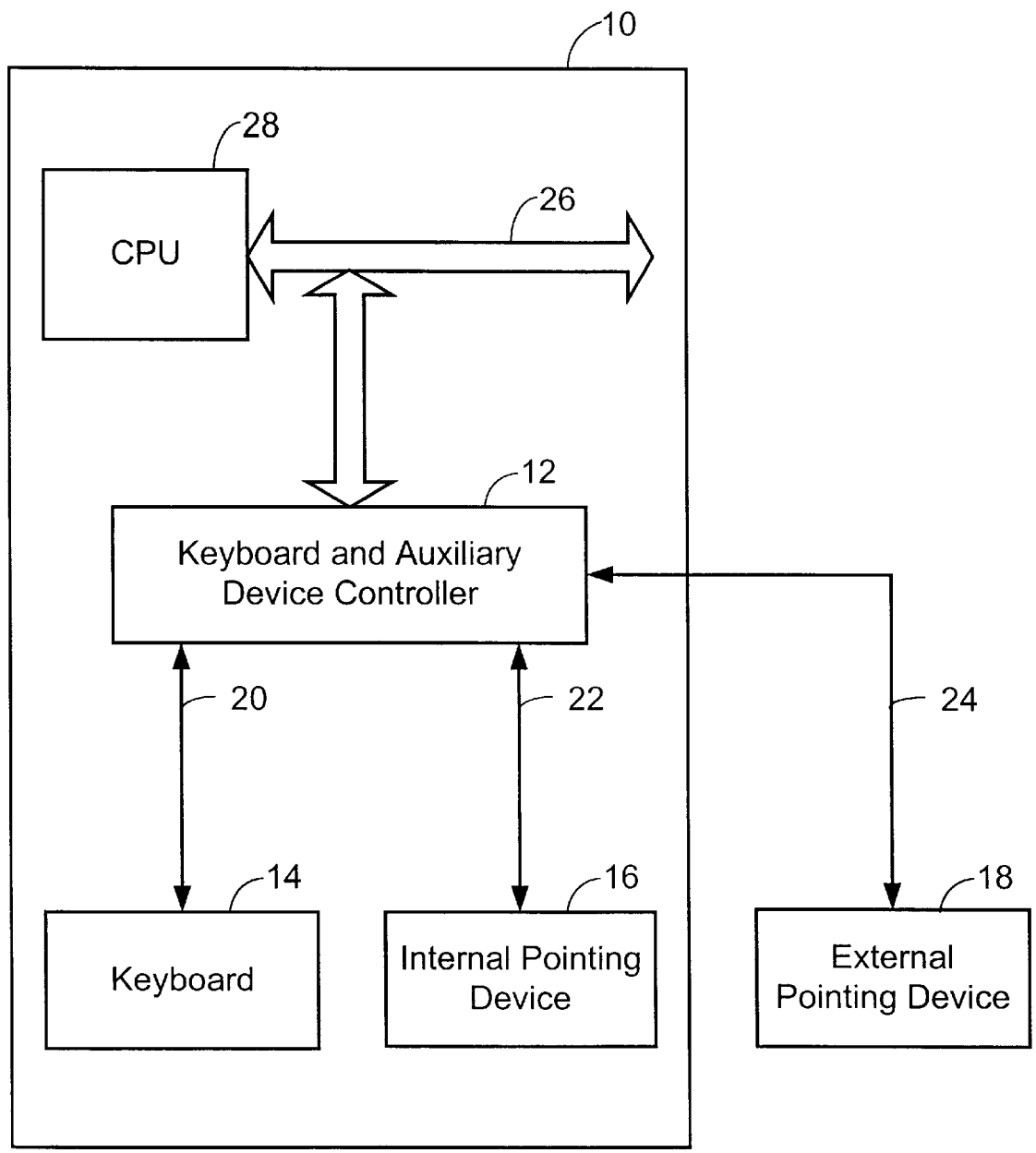
FIG. 1 is a block diagram of the hardware for a computer with internal and external pointing devices.

While the invention is susceptible to various modifications and alternative forms, specific embodiments have been shown by way of example in the drawings and will be described in detail herein. However, it should be understood that the invention is not limited to the particular forms disclosed. Rather, the invention covers all modifications, equivalents, and alternatives falling within the spirit and scope of the invention as defined in the appended claims.

DETAILED DESCRIPTION OF SPECIFIC EMBODIMENTS

One specific embodiment of the invention is described below with reference to FIGS. 4 to 8. This embodiment makes use of the fact that the KBC in a notebook computer provides a common communication channel for all commands and data sent between the device driver and both internal and external pointing devices. In this embodiment, the KBC controller intercepts the "Read ID" command sent from the device driver to the pointing devices at startup and reports back to the device driver the device ID of the pointing device with the maximum size of data packet. All data packets from pointing devices with fewer bytes than the maximum are padded by the KBC with additional bytes so that the overall size of the data packet from each pointing device is the same and is equal to the maximum size. As a result, the device driver always receives data packets of the same (maximum) size, allowing normal operation with pointing devices with different data packet dimensions.

Figure 4:
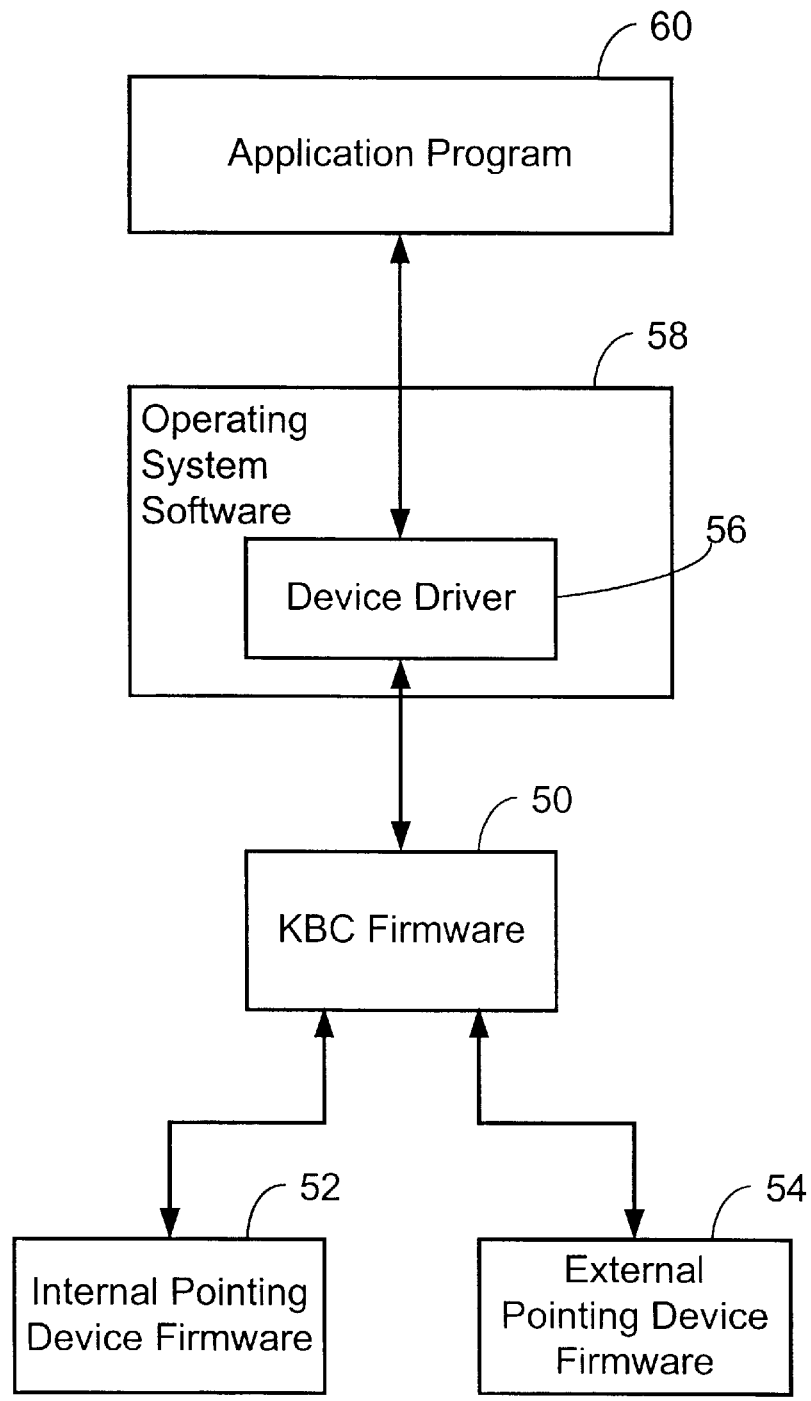
FIG. 4 is a block diagram of the software and firmware components of a computer with internal and external pointing devices.

Turning now to the drawings and referring initially to FIG. 4, a block diagram is shown of the software and firmware components for a notebook computer with internal and external pointing devices. The KBC 12, internal pointing device 16, and external pointing device 18 shown in FIG. 1 include, respectively, KBC firmware 50, internal pointing device firmware 52, and external pointing device firmware 54. The internal and external pointing device firmware 52 and 54 provides the pointing devices with the ability to receive commands from the computer, and send data back to the computer corresponding to the movements of the pointing device and pointing device buttons. A device driver 56 is typically included as part of the computer's operating system software 58. Device driver 56 operates as the interface between the operating system software 58 and the pointing devices 16 and 18.

The KBC firmware 50 communicates with the internal pointing device firmware 52, external pointing device firmware 54, and device driver 56. The device driver 56 typically communicates with an application program 60 which controls the movement of the cursor on the display. Thus, data from the pointing devices and control commands from the device driver may be exchanged by interaction of the KBC firmware 50, internal pointing device firmware 52, external pointing device firmware 54, and device driver 56. Because all commands and data exchanged between the device driver 56 and pointing devices are channeled through the KBC, the additional logic required to synchronize the data packets from standard pointing devices and extended mode pointing devices can be conveniently included in the KBC firmware 50.

Figure 5:
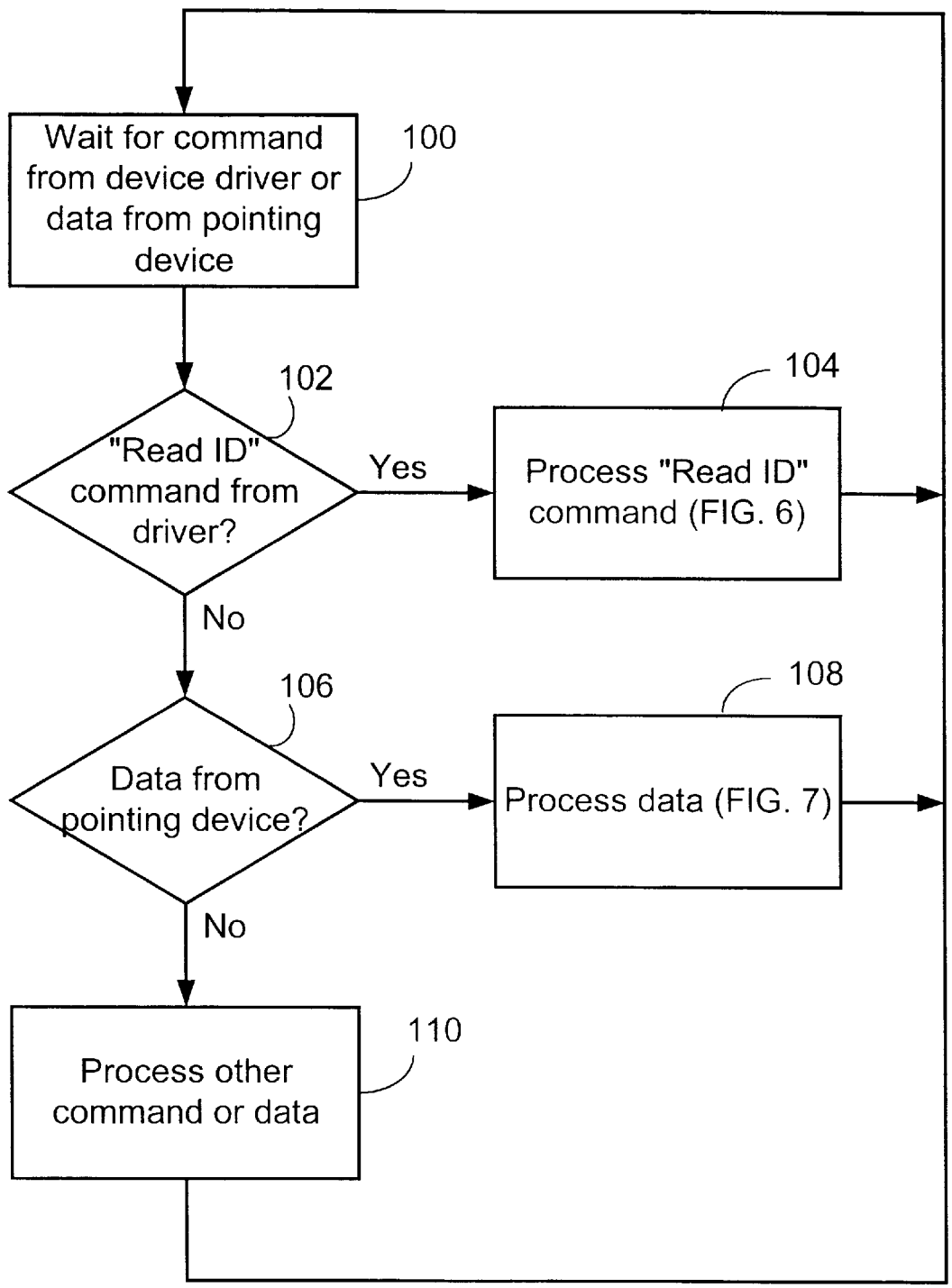
FIG. 5 is a flow chart showing a program to permit the use of both internal and external pointing devices, including an extended mode pointing device.
Figure 6:
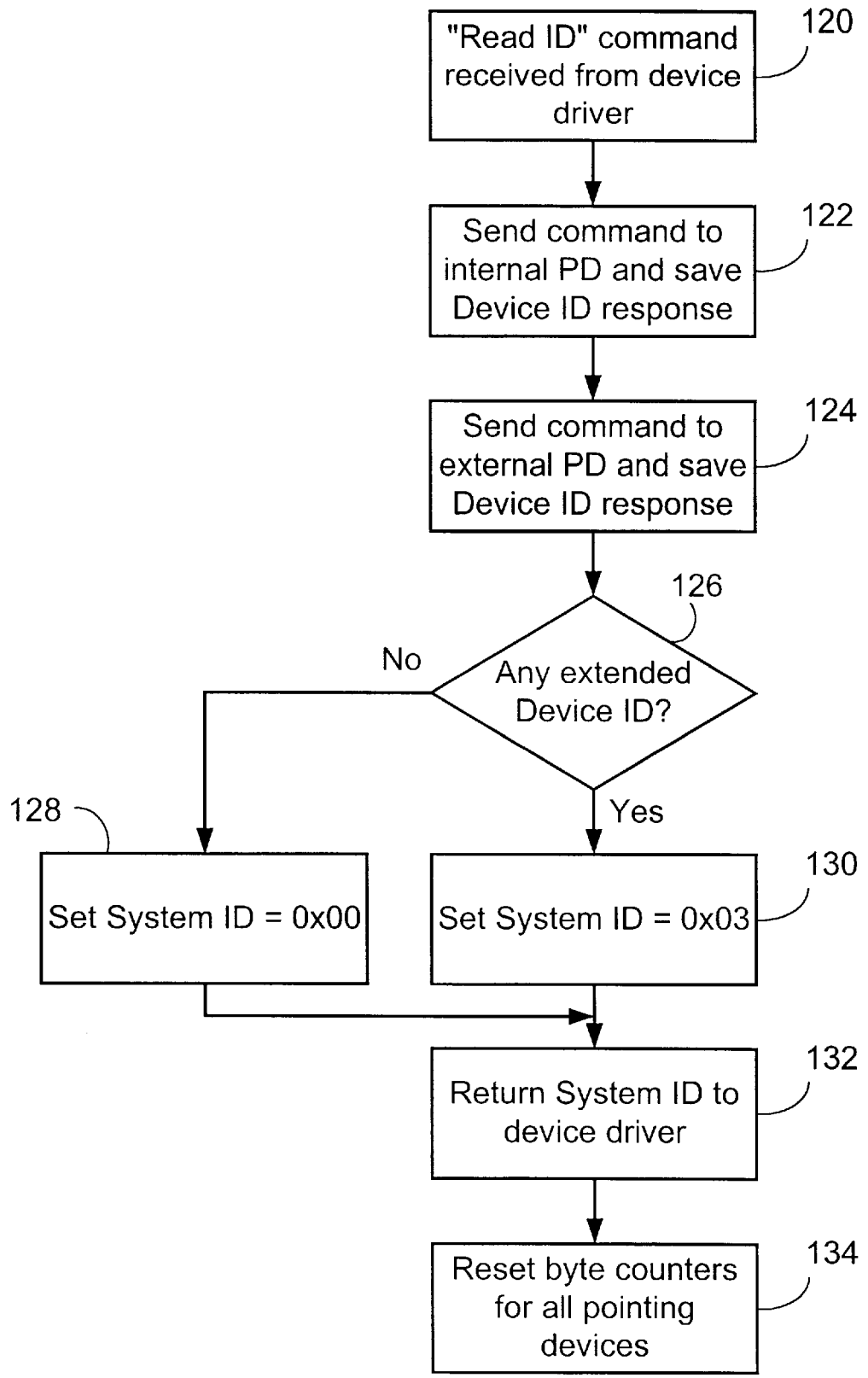
FIG. 6 is a flow chart showing the processing of a "Read ID" command received from a device driver.
Figure 7:
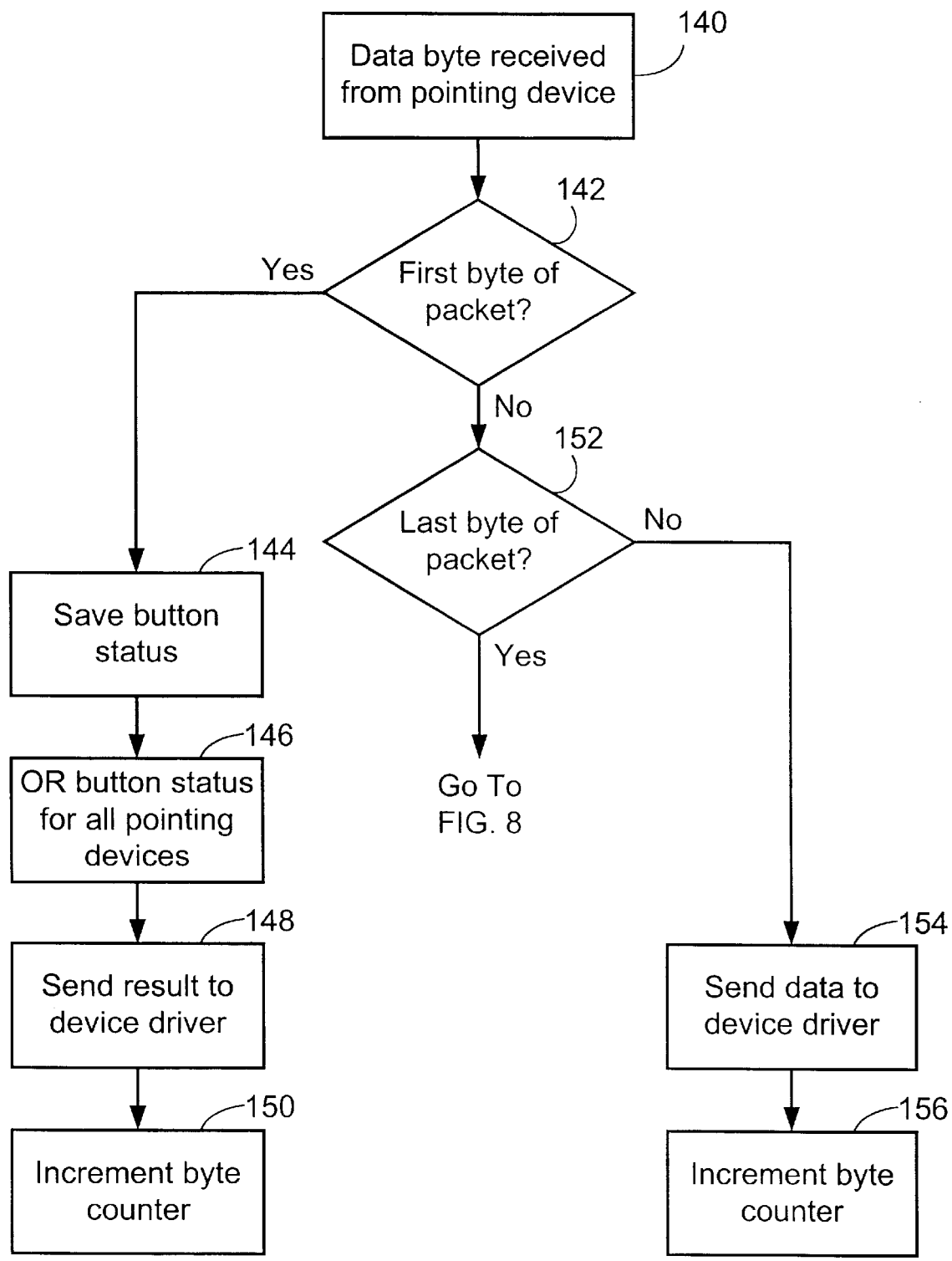
FIGS. 7 and 8 are flow charts showing the processing of a data byte received from a pointing device.

FIG. 5 shows a flowchart for a program that may be included in the KBC firmware 50 to permit use of both internal and external pointing devices, where the external pointing device may be an extended mode pointing device. Initially, the program waits to receive either a command from the device driver 56 or data from one of the pointing devices 52 or 54 (step 100). Once either a command or data byte is received, the program determines if a "Read ID" command was received from the device driver 56 (step 102). If a "Read ID" command was received, the command is processed as shown in FIG. 6 and described below (step 104) and the program subsequently returns to step 100 to await receipt of another command or data. If a data byte was received (and a "Read ID" command was not received) (step 106), the data byte is processed as shown in FIG. 7 and described below (step 108), and the program subsequently returns to step 100 to await receipt of another command or data. If a command other than a "Read ID" command was received, or data other than data from the pointing devices was received (e.g. data from the keyboard), that command or data is processed in the conventional manner (step 110) and the program returns to step 100 to await receipt of another command or data.

FIG. 6 illustrates the processing of a "Read ID" command received from device driver 56. A "Read ID" command is typically generated by the device driver 56 when the operating system 58 is started to determine the types of pointing devices connected to the computer. When a "Read ID" command is received from the device driver 56 (step 120), the commaid is sent to the internal pointing device, and the internal pointing device firmware 52 generates a device ID in response to the command. The device ID for a standard pointing device is 0x00 and for an extended mode pointing device it is 0x03. This device ID is sent back to the KBC firmware 50 and the device ID is saved (step 122) for use by the program at a later stage. The "Read ID" command is then sent to the external pointing device and the device ID received in response from the external pointing device firmware 54 is saved (step 124).

The program next checks to see if a device ID for an extended device (i.e. 0x03) was received from any of the pointing devices (step 126). An extended device ID will be generated by a pointing device that produces four-byte data packets (such as an extended mode pointing device), requiring the device driver to operate in extended mode. If no extended ID was received from the pointing devices, the system ID is set to 0x00 to indicate that all of the pointing devices are standard type and that no extended mode pointing devices are connected (step 128).

If an extended device ID was received from the pointing devices, the system ID is set to 0x03 to indicate that at least one extended mode pointing device is connected and to enable operation in extended mode (step 130). The system ID determined above is then sent back to the device driver 56 (step 132) and the byte counters (described below) for all pointing devices are reset to their initial value (step 134).

Figure 2:
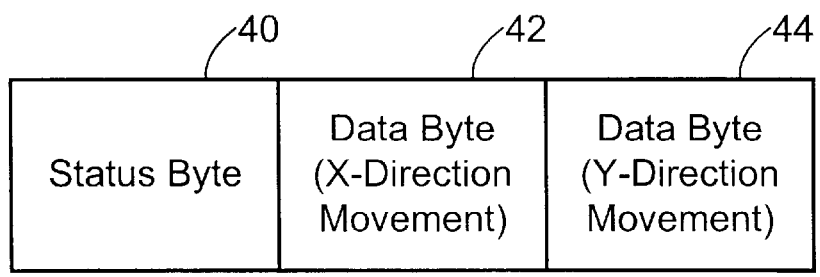
FIG. 2 is a diagram showing data packets generated by a standard pointing device.
Figure 3:
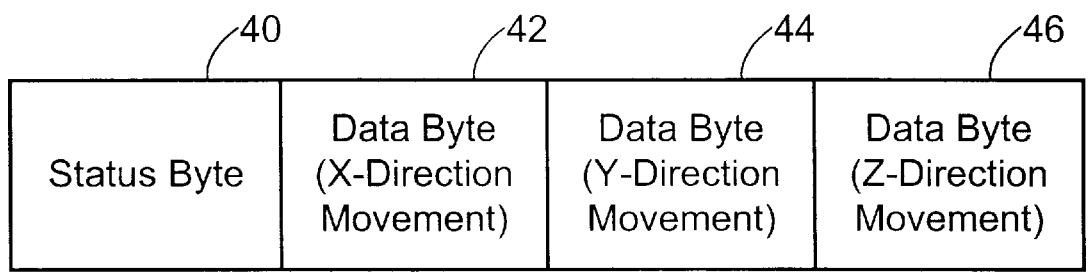
FIG. 3 is a diagram showing data packets generated by an extended mode pointing device.
Figure 8:
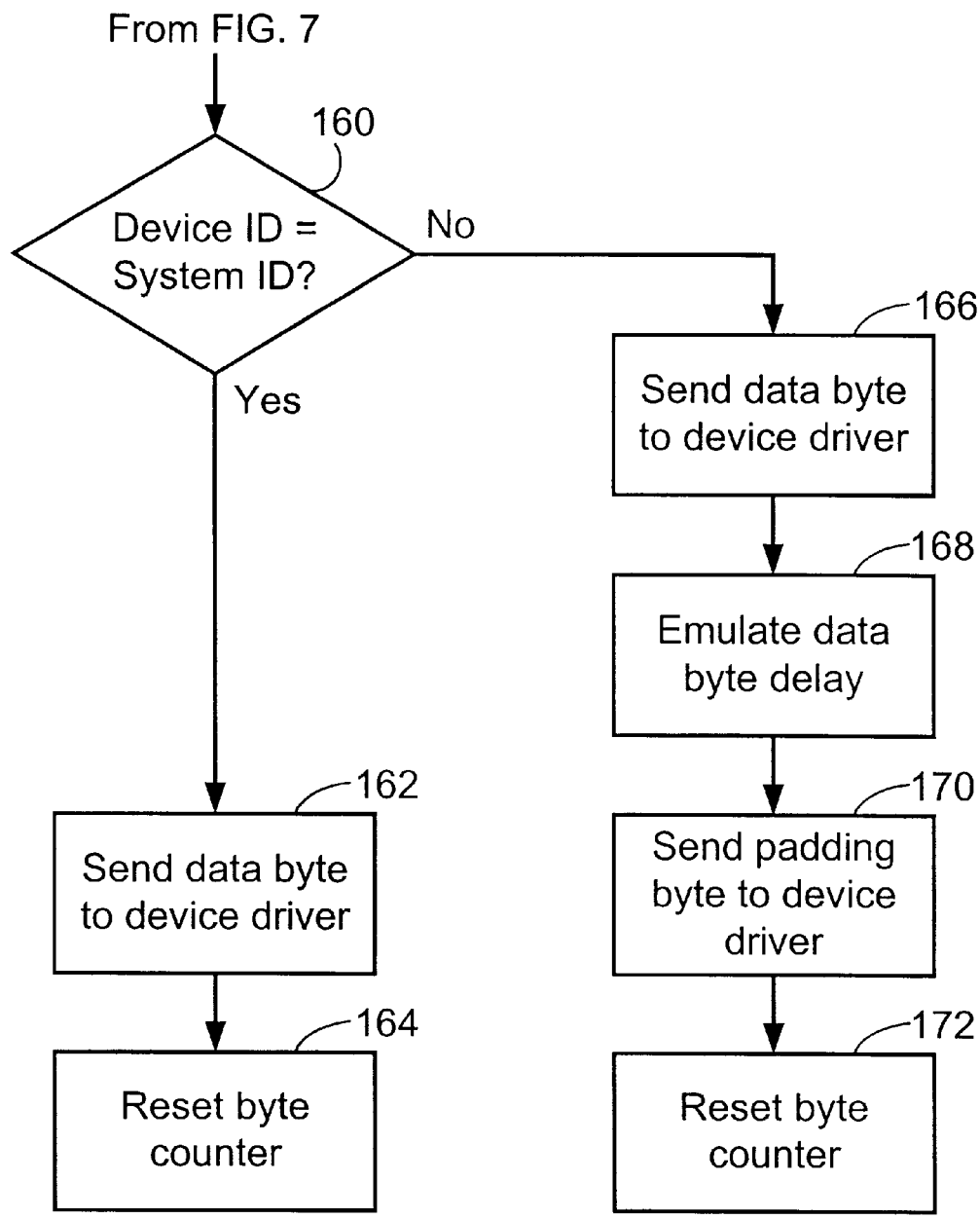

FIGS. 7 and 8 illustrate the processing of a data byte received from a pointing device. As shown in FIG. 7, when a data byte is received from one of the pointing devices (step 140), the program checks to see if the byte is the first byte of a data packet (step 142) by determining if the byte counter is at its initial value. The first byte of the data packet contains status data for the pointing device (as shown in FIGS. 2 and 3). Conventional pointing devices include one or more buttons for selecting display icons or performing other operations. The status data for these buttons (i.e. which buttons the user has pressed) is included in the status byte of the data packet generated by the pointing device.

If the data byte received is the first byte, the status of the pointing device buttons is saved (step 144). The first byte is identified by examining the byte counter. The byte counter is a counter that is incremented as each byte is processed, and reset to an initial value when a complete data packet has been processed. The byte counter will be at its initial value if the byte is the first byte. The program then performs a logical OR operation on the pointing device button status for all of the pointing devices, to determine if any of the pointing device buttons have been pressed by the user (step 146). The result of the OR operation is sent ito the device driver 56 (step 148) and the byte counter is incremented (step 150). At this point, the processing of the data byte is complete, and the program resumes waiting for a command or data at step 100 shown in FIG. 5.

If the data byte received is not the first byte, the byte counter is examined to see if the byte is the last byte (step 152). A byte counter value of three will indicate the last byte of the packet if the pointing device that sent the data byte generated a standard device ID (i.e. 0×00)), and a byte counter value of four will indicate the last byte of the packet if the pointing device that sent the data byte generated an extended device ID (i.e. 0×03). If the data byte received is not the first byte or last byte of the data packet, the data byte is sent to the device driver 56 (step 154), the byte counter is incremented (step 156), and the processing of the data byte i3 complete. The program resumes waiting for a command or data at step 100 shown in FIG. 5.

If the data byte received is the last byte of the data packet, the byte is processed as shown in FIG. 8. In current designs, for a standard pointing device with device ID of 0×00, the last byte will be the third byte of the data packet, as indicated by the count accumulated by the byte counter, as described above. For an extended mode pointing device with device ID of 0×03, the last byte will be the fourth byte of the data packet, as indicated by the byte counter. Note that the present invention is not limited to these particular device Ids, but may be extended to include any device IDs used to indicate the size of the data packet generated by a pointing device.

If the device ID generated by the pointing device that sent the data byte is the same as the system ID calculated by the program (shown in steps 128 and 130 of FIG. 6), this indicates that either: (1) no extended mode pointing device is connected (i.e. a three-byte data packet will be expected) and the pointing device sending the data is a standard pointing device, or (2) extended mode pointing device is connected (i.e. a four-byte data packet will be expected) and the pointing device sending the data is an extended mode pointing device. In either situation, the program need not make any adjustment to the data packet size received from the pointing device because it matches the data packet size expected by the device driver 56.

Thus, returning to FIG. 8, if the device ID equals the system ID (Step 160), the data byte is sent to the device driver 56 (step 162), the byte counter is reset to its initial value (step 164), and the processing of the data byte is complete. The program resumes waiting for a command or data at step 100 shown in FIG. 5.

If the device ID is different from the system ID, this indicates that the pointing device sending the data is a standard pointing device in a system that includes an extended mode pointing device. Thus, the data packet received from the standard pointing device will only include three bytes and must be padded in order to produce a four-byte data packet expected by the device driver 56. The data byte received is sent to the device driver 56 (step 166). The program then waits for a period of time to emulate the transmission and processing delay that would occur if the program waited for another byte of data from the pointing device (step 168). The program then generates a data byte containing zeros (or any other suitable padding) and sends the byte to the device driver 56 (step 170). This additional byte extends the data packet from the pointing device so that a four-byte data packet will be received by the device driver 56. The byte counter is then reset to its initial value (step 172), and the processing of the data byte is complete. The program resumes waiting for a command or data at step 100 shown in FIG. 5.

Thus, one embodiment of the invention has been described providing a means to enable the use of multiple pointing devices which generate data packets of different sizes. The program described above with reference to FIGS. 4 to 8 illustrates one means for enabling the se of a standard pointing device (generating three-byte data packets) and an extended mode pointing device (generating four-byte data packets). However, the described program could be readily modified using conventional techniques well known to those of skill in the art to accommodate the varying requirements of different computer systems.

For example, the program could be modified for operation with multiple pointing devices where the data packet sizes vary by more than one byte, by adding multiple bytes to the smaller data packets to match the size of the largest data packet. Similarly, the program could be modified to allow for three or more different sizes of data packets, by adding the number of bytes needed to make each data packet equal to the largest data packet generated by any of the pointing devices. The program also could be modified for operation with any number of internal pointing devices and any number of external pointing devices. For example, the program could be modified to operate with a notebook computer with a touch. pad and a pointing stick, and one or more external pointing devices as well.

In addition, the program could be modified to use a different technique for determining the size of data packet generated by each pointing device. For example, the size of the data packet could be coded into the status byte of each data packet, and the program could use this data to determine the number of data bytes expected from the pointing device and the maximum size of data packet expected from any of the pointing devices.

Furthermore, the embodiment of the invention described above is implemented entirely in software residing in the KBC. However, other techniques could be employed to implement the logic. For example, the functions of the program illustrated in FIGS. 5 to 8 could be implemented using software included in the device driver or included as a separate component of the computer's operating system. Alternatively, the functions of the program could be modified for implementation using hardware such as a programmable logic array or similar device.

Many other modifications and variations may be made to the techniques and structures described and illustrated without departing from the spirit and scope of the invention. Accordingly, it should be understood that the methods described herein are illustrative only and are not limiting upon the scope of the invention.

What is claimed is:

1. A method for operating a computer in conjunction with two or more pointing devices which generate data packets, the method comprising the steps of:

determining a maximum size of said data packets generated by said two or more pointing devices;

receiving a first data packet from a first pointing device, said first pointing device being one of said two or more pointing devices;

determining if said first data packet has a size smaller than said maximum size; and increasing said size of said first data packet so that said first data packet has a size equal to said maximum size.

2. The method of claim 1, wherein said step of determining a maximum size of said data packets comprises:

sending a command to each of said pointing devices for causing each of said pointing devices to respond with a signal indicating a size of data packet generated by the respective pointing device;

receiving said signals from said pointing devices; and analyzing said signals to determine said maximum size of said data packets generated by said pointing devices.

3. The method of claim 2, wherein said step of determining if said first data packet has a size smaller than said maximum size comprises:

receiving a first signal from said first pointing device;

identifying a second signal corresponding to said maximum size of said data packets; and comparing said first signal to said second signal, wherein if said first signal is not equal to said second signal then said first data packet has a size smaller than said maximum size.

4. The method of claim 3, wherein said step of increasing said size of said first data packet comprises:

generating one or more additional data bytes if said first signal is not equal to said second signal; and adding said one or more additional data bytes to said first data packet.

5. The method of claim 1, wherein said computer is operated in conjunction with two or more pointing devices, including one or more internal pointing devices and one or more external pointing devices.

6. A computer system comprising:

two or more pointing devices, each pointing device for generating a data packet;

a controller connected to said pointing devices for receiving said data packets, determining a maximum size of said data packets, and adding one or more bytes to each data packet received from said pointing devices which is smaller than said maximum size.

7. The computer system of claim 6, wherein said controller determines said maximum size of said data packets by sending a command to each of said pointing devices for causing each of said pointing devices to respond with a signal indicating a size of data packet generated by the respective pointing device, receiving said signals from said pointing devices; and analyzing said signals to determine said maximum size of said data packets generated by said pointing devices.

8. The computer system of claim 6, wherein said pointing devices include one or more internal pointing devices and one or more external pointing devices.

9. A computer system comprising:

a first pointing device for generating a first signal and a first data packet;

a second pointing device for generating a second signal and a second data packet;

a controller connected to said first and second pointing devices for receiving said first signal and first data packet and said second signal and second data packet, analyzing said signals to determine said maximum size of said data packets generated by said pointing devices, and adding one or more bytes to each data packet received from said pointing devices which is smaller than said maximum size.

10. The computer system of claim 9 wherein said first pointing device is an internal pointing device and said second pointing device is an external pointing device.

11. A controller for use with a computer in conjunction with two or more pointing devices which generate data packets, the controller comprising:

means for determining a maximum size of said data packets generated by said two or more pointing devices;

means for receiving a first data packet from a first pointing device, said first pointing device being one of said two or more pointing devices;

means for determining if said first data packet has a size smaller than said maximum size; and means for increasing said size of said first data packet so that said first data packet has a size equal to said maximum size.

* * * * *